United States Patent [19]

Hearn

[11] Patent Number: 5,266,546
[45] Date of Patent: Nov. 30, 1993

[54] CATALYTIC DISTILLATION MACHINE

[75] Inventor: Dennis Hearn, Houston, Tex.

[73] Assignee: Chemical Research & Licensing Company, Pasadena, Tex.

[21] Appl. No.: 901,771

[22] Filed: Jun. 22, 1992

[51] Int. Cl.5 .............................................. B01J 35/04
[52] U.S. Cl. ................................... 502/300; 502/527; 203/DIG. 6
[58] Field of Search ...................... 502/527, 300, 333; 203/DIG. 6

[56] References Cited

U.S. PATENT DOCUMENTS

| | | | |
|---|---|---|---|
| 2,403,672 | 7/1946 | Matuszak | 260/683.2 |
| 4,195,063 | 3/1980 | Iwaoka | 422/180 |
| 4,215,011 | 7/1980 | Smith | 252/426 |
| 4,232,177 | 11/1980 | Smith | 585/324 |
| 4,242,530 | 12/1980 | Smith | 585/510 |
| 4,250,052 | 2/1981 | Smith | 252/426 |
| 4,271,044 | 6/1981 | Fratzer | 252/462 |
| 4,388,275 | 6/1983 | Fratzer | 422/180 |
| 4,443,559 | 4/1984 | Smith | 502/527 |
| 5,057,468 | 10/1991 | Adams | 502/1 |

*Primary Examiner*—W. J. Shine
*Attorney, Agent, or Firm*—Kenneth H. Johnson

[57] ABSTRACT

A catalytic distillation structure comprising a tube of open mesh wire containing particulate catalyst and sealed on each end along seams at 15° to 90° relative to each other.

10 Claims, 2 Drawing Sheets

CATALYTIC DISTILLATION MACHINE

BACKGROUND OF THE INVENTION

1. Field of the Invention

The present invention relates to a structure which can be used in reactions wherein the reaction and distillation of the reaction system are carried on concurrently using the structure as both catalyst for the reaction and as a distillation structure.

2. Related Art

U.S. Pat. No. 4,215,011 discloses a plurality of closed cloth pockets containing a particulate catalytic material arranged and supported by wire mesh. U.S. Pat. No. 4,250.052 discloses distillation packing structure consisting of sulfonated cation resin.

U.S Pat Nos. 4,232,177 and 4,242,530 disclose the use of such structures for various catalytic reaction processes. U.S. Pat. No. 2,403,672 functionally states that the catalyst serves as the packing material in the column to fractionate the reaction products, however, no indication of the physical means to obtain this is disclosed.

U.S. Pat. No. 4,443,559 discloses catalytic distillation structures for use in reaction distillation columns. These catalytic structures being in the shape of a single cylinder, sphere, doughnut, cube, or tube.

The present invention provides a catalytic distillation structure for use in reactions, which can be used as a distillation structure. In order to serve both functions, it has been found that the structure must meet three criteria. First, the structure must be such as to provide for even spatial dispersement in the reactor distillation column. That is, the catalyst structures must rest in the column in a geometric arrangement which will perform the desired functions of reaction and distillation sites. To achieve this the structure must be such as to provide fairly uniform spatial distribution in the column.

A second criteria is that there must be sufficient free space in the catalyst bed to allow for the liquid phase surface contact and vapor phase distillation with the concurrent separation of the material in the column by the distillation into vapor and liquid phases. It has been observed that in the catalyst bed a free space of about 50 volume % is adequate to obtain an operable fractionation.

A third criteria is the necessity for the catalyst bed to b able to expand and contract as it must during use without undue attrition of the catalyst.

These criteria have been met in the structures described and used in U.S. Pat. Nos. 4,242,530; 4,232,177; 4,250.052, 4,215,011 and 4,443,559 described above.

SUMMARY OF THE INVENTION

Briefly the present invention is a catalytic distillation structure comprising flexible, semi-rigid open mesh tubular material filed with a particulate catalytic material said tubular material having two ends and having a length in the range of from about one-half to twice the diameter of said tubular material, a first end being sealed together along a first axis to form a first seam and a second end being sealed together along a second axis to form a second seam wherein the plane of the first seam along the axis of said tubular material and the plane of the second seam along the axis of said tubular material bisect each other at an angle of about 15° to 90°.

The catalyst component may take several forms. In the case of particulate catalytic material, generally from 60 mm to about 1 mm down through powders, is enclosed in a porous container such as screen wire, or polymeric mesh. The material used to make the container must be inert to the reactants and conditions in the reaction system. The screen wire may be aluminum, steel, stainless steel, and the like. The polymer mesh may be nylon, teflon, or the like. The mesh or threads per inch of the material used to make the container is such that the catalyst is retained therein and will not pass through the openings in the material. Although the catalyst particles of about 0.15 mm size or powders may be used and particles up to about ¼ inch diameter may be employed in the containers. It may be advantageous to use a particle size in the range of from about 0.25 mm to 1 mm.

Each catalytic distillation structure containing a solid catalytic material comprises a catalyst component within a container, preferably comprising a resilient material which is comprised of at least 70 volume % open space up to about 95 volume % open space. The total volume of open space for the catalytic distillation structure should be at least 10 volume % and preferable at least 20 volume % up to about 65 volume %. Thus, desirably the resilient material should comprise about 30 volume % to 70 volume %. One suitable such material is open mesh knitted stainless wire, known generally as demister wire or an expanded wire or an expanded aluminum. Other resilient components may be similar open mesh knitted polymeric filaments of nylon, Teflon and the like.

The present invention is a packet container composed of a wire mesh tube that has been closed by flattening the tub together at one end and then secured with staples or other appropriate means such as crimping, welds, or sewn metal, etc. The tube container is then filled with the appropriate catalyst material. The second end of the wire mesh tube is closed in a like manner as the first end, so that the axis of the second closed end is perpendicular to the axis of the first closed end.

DETAILED DESCRIPTION AND PREFERRED EMBODIMENTS

Figure 1:
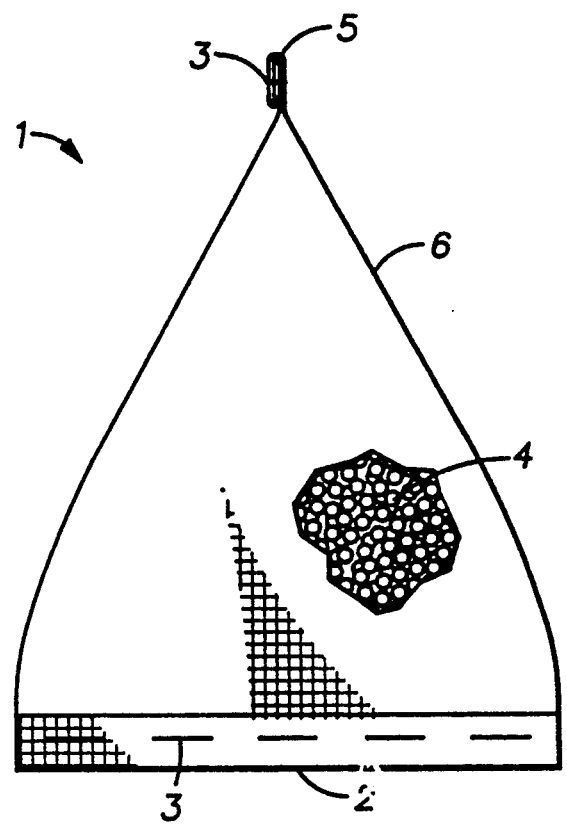
FIG. 1 is a packet configuration of the present catalytic distillation structure.
Figure 2:
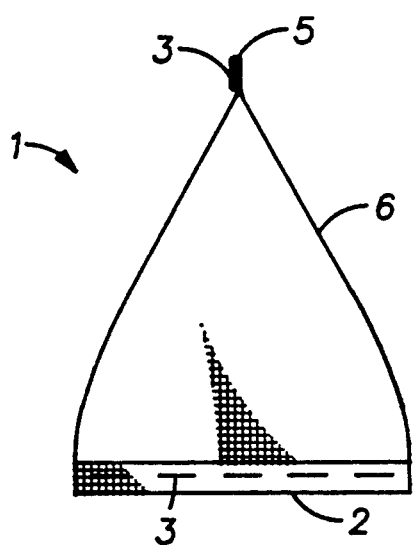
FIG. 2 is top view of the catalytic distillation structure.
Figure 3:
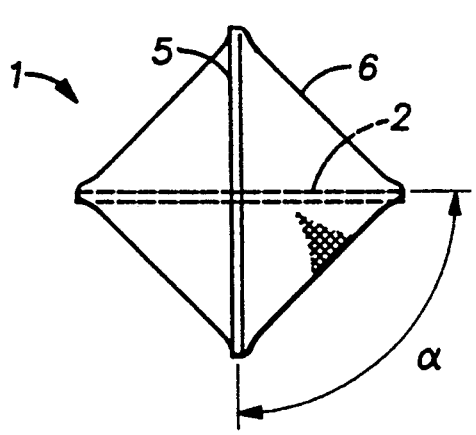
FIG. 3 is a front view of the catalytic distillation structure.
Figure 4:
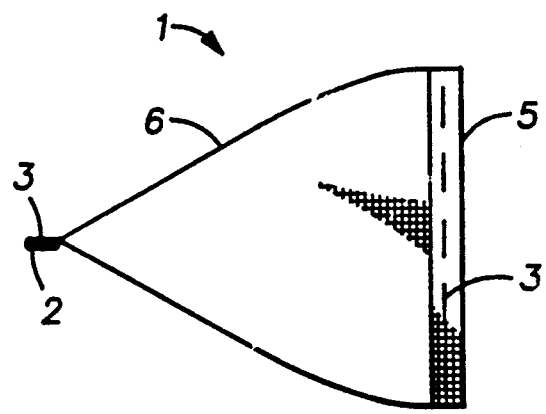
FIG. 4 is side view of the catalytic distillation structure.
Figure 5:
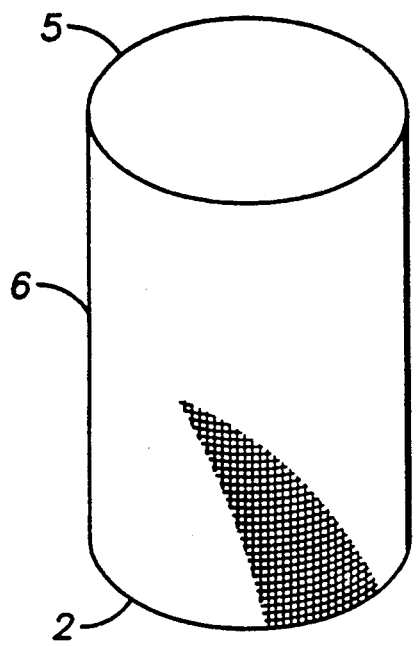
FIG. 5 is a tube (woven wire sock) of demister wire.
Figure 6:
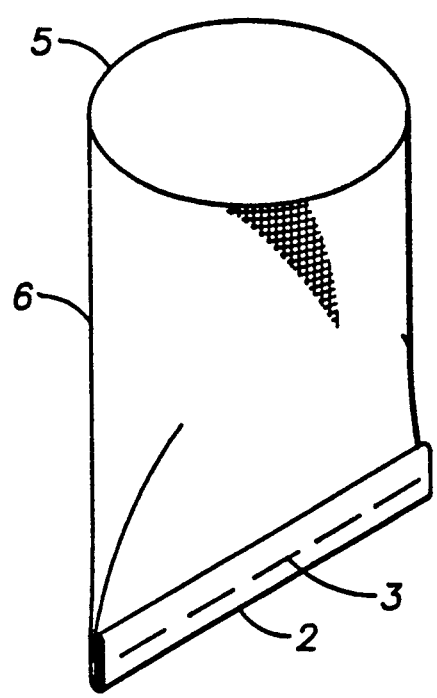
FIG. 6 is the tube of FIG. 5 crimped at one end.
Figure 7:
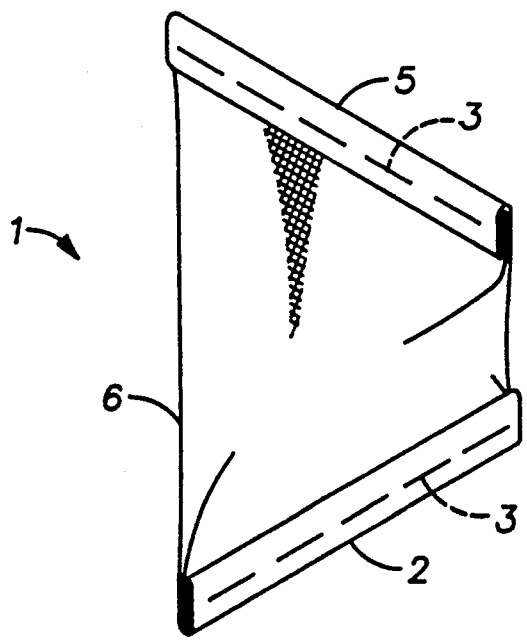
FIG. 7 is the tube of FIG. 6 crimped at both ends.

FIGS. 1, 2, 3 and 4 show a packet configuration of the present catalytic distillation structure. FIGS. 5, 6 and 7 show the steps of fabrication of a packet using demister wire. In FIG. 1, the catalyst structure 1 is composed of a wire mesh tube 6 that has been flattened together at one end 2 and then closed with staples 3 or other appropriate means such as crimping, welds, or sewn metal, etc. The tube container is then filled with the appropriate catalyst material 4 through the second end 5. The second end 5 of the wire mesh tube is then flattened and closed, so that the axis of the second closed end is perpendicular to the axis of the first closed end. The second end 5 may be closed with staples 3 or other appropriate means such as crimping, welds, or sewn metal, etc. In FIG. 3 the angle α of the intersection of the plane of end 1 and the plane of end 5 is about 90°.

In the place of the wire mesh, equivalent materials made from polymers may be used. In place of staples or sewn seams, adhesives may be used, with the only proviso being that the materials employed withstand attack by the materials and conditions in the reactor distillation column.

The preferred catalytic distillation structures, as described and shown, when placed in the reactor distillation column will by virtue of the resilient component, i.e., the tubular container with the sealed ends, cause the catalyst components to be evenly distributed through the area provided. Usually there will be provided support means along the column with beds of the present catalytic distillation structures thereon similar to sieve trays with some space between the trays, although long continuous beds may be employed.

The size of catalyst components and the relative amount of the resilient component associated therewith or surrounding the catalyst components will determine the open space in the bed, which should be at least about 10 volume % and preferably at least 20 volume %. In the case of longer beds, it may be desirable to have a larger open space, thus a larger volume of the resilient material compared to the catalyst component would be employed.

Although the present catalytic distillation structure is especially useful for a process where there is a concurrent reaction distillation, it is also very useful for vapor phase reactions, since the catalyst bed prepared from the present structure provides a very low pressure drop therethrough.

The catalytic material may be any material, appropriate for the reaction at hand, that is, it may be an acid catalyst or a basic catalyst or others such as catalytic metals and their oxides or halides, suitable for a multitude of catalytic reactions and, of course, heterogeneous with the reaction or other fluids in the system. Some specific reactions are:

| CATALYST | REACTION |
| --- | --- |
| Acid cation exchange resins | dimerization, polymerization, etherification, esterification, isomerization, alkylation |
| Magnesia, chomia, brucite | isomerization |
| Molecular sieves (synthetic alumino-silicates) | dimerization, polymerization, alkylation, isomerization, selective hydrogenation, dehyrogenation |
| Cobalt thoria | Fisher-Tropsch process |
| Cobalt molybdate | hydrofining |

The material for forming the container may be the wire mesh materials, such as stainless steel, expanded aluminum, or the like. Suitable adhesives such as epoxys or various of the hot melt adhesives which are not softened at the temperatures of use or attacked by the reactants or products may be used to join both polymeric materials and wire into the appropriate configuration. Similarly staples, brads or other fastening means may by used. The wire may be sealed by welding. In a similar fashion, seals may be obtained with laser welding on the meltable materials.

The individual catalytic distillation structures can vary in size from about ½ inch to one foot, e.g., a ¼ inch tablet may be incased in ½ tube of demister wire or a ¼ inch cloth tube containing granular resin beads, one foot long may be incased in ½ layer of demister wire.

The catalytic distillation structure may be individually and randomly placed into a reactor distillation column or arranged in specific patterns or groupings. Moreover, any catalyst bed may be a mixture of various shapes and sizes of the present catalytic distillation structure.

EXAMPLE

For comparison a catalyst packing as described in U.S. Pat. No. 4,215,011 was compared to the structures of the present invention. The prior packing consisted of bags in the form of a fiber glass cloth belt approximately six inches wide with narrow pockets approximately ¾ to 1¼ inch wide sewn across the belt. These pockets are filled with the catalyst particles to form approximately cylindrical containers, and the open ends are then sewn closed to confine the particles. This belt is then twisted into a helical form to fit inside the column. Twisted in with the belt is also a strip of an open mesh knitted stainless steel wire, which serves to separate the catalyst filled cloth pockets and provide a passage for vapor flow.

The structures of the present invention were woven wire mesh packets as shown in FIG. 1. Both the prior packing and the present structures were filled with an alumina supported palladium catalyst for the selective hydrogenation of contaminants in propylene. Substantially the same amount of catalyst was used for each run. The particular contaminant being methyl acetylene and propadiene (MAPD) which undergoes an equilibrium transformation with propadiene. It has been found that a wire mesh packet is superior to cloth packet catalyst packing for removing MAPD from a propylene stream. When catalyst was contained in the cloth containers of the prior art, higher temperatures and much higher hydrogen mole ratios were needed. The supposition is that the cloth is acting as a barrier to the hydrogens ability to contact the contained catalyst. (See TABLE I below)

TABLE I

| | CLOTH | WIRE MESH |
| --- | --- | --- |
| AVG. CATALYST TEMP. °F. | 118 | 110 |
| *HYDROGEN MOLE RATIO | 1.8 | 1.1 |
| FEED RATE (LB/HR) | 90 | 90 |
| OVER HEAD PRESS. (PSIG) | 270 | 240 |
| PRODUCT MAPD | <1 PPM | 1 PPM |

*The hydrogen mole ratio is defined as the moles of hydrogen fed divided by the moles of MAPD fed.

The invention claimed is:

1. A catalytic distillation structure for use in packed beds having low pressure drop therethrough comprising a flexible, semi-rigid open mesh tubular material filled with a particulate catalytic material, said tubular material having two ends and having a length in the range from about one-half to two times the diameter of said tubular material, a first end being sealed together along a first axis to form a first seam and a second end being sealed together along a second axis to form a second seam wherein the plane of the first seam along the axis of said tubular material and the plane of the second seam along the axis of said tubular material bisect each other at an angle of from about 15° to 90°.

2. The catalytic distillation structure according to claim 1 wherein said tubular material comprises up to about 95 volume % open space.

3. The catalytic distillation structure according to claim 1 wherein said tubular material comprises 30 to 70 volume % of said catalytic distillation.

4. The catalytic distillation structure according to claim 1 wherein said tubular material comprises polymeric mesh, wire mesh, stainless steel screen wire or aluminum screen wire.

5. The catalytic distillation structure according to claim 4 wherein said particulate catalytic material comprises a particle size in the range of from about 0.15 mm to about ¼ inch.

6. The catalytic distillation structure according to claim 5 wherein the particle size in the range of from about 0.25 mm to 1 mm.

7. The catalytic distillation structure according to claim 1 containing from about 10 to 65 volume % open space.

8. The catalytic distillation structure according to claim 1 wherein the openings in said tubular material are smaller then the diameter of particles of catalyst.

9. The catalytic distillation structure according to claim 1 wherein said first plane and second plane bisect at about 90°.

10. An array of a plurality of catalytic distillation structures each comprising a flexible, semi-rigid open mesh tubular material filled with a particulate catalytic material, said tubular material having two ends and having a length in the range from about one-half to two times the diameter of said tubular material, a first end being sealed together along a first axis to form a first seam and a second end being sealed together along a second axis to form a second seam wherein the plane of the first seam along the axis of said tubular material and the plane of the second seam along the axis of said tubular material bisect each other at an angle of from about 15° to 9°.

* * * * *